US012619916B1

(12) United States Patent
Vorse

(10) Patent No.: US 12,619,916 B1
(45) Date of Patent: May 5, 2026

(54) SYSTEM AND METHOD FOR USER-GUIDED CONTEXT RESET IN CONVERSATIONAL ARTIFICIAL INTELLIGENCE SYSTEMS

(71) Applicant: Scot K Vorse, Los Angeles, CA (US)

(72) Inventor: Scot K Vorse, Los Angeles, CA (US)

( * ) Notice: Subject to any disclaimer, the term of this patent is extended or adjusted under 35 U.S.C. 154(b) by 0 days.

(21) Appl. No.: 19/377,594

(22) Filed: Nov. 3, 2025

Related U.S. Application Data

(60) Provisional application No. 63/869,020, filed on Aug. 22, 2025.

(51) Int. Cl.
*G06N 20/00* (2019.01)
*G06F 40/30* (2020.01)

(52) U.S. Cl.
CPC ............. *G06N 20/00* (2019.01); *G06F 40/30* (2020.01)

(58) Field of Classification Search
CPC ................................ G06N 20/00; G06F 40/30
See application file for complete search history.

(56) References Cited

U.S. PATENT DOCUMENTS

| | | | | |
|---|---|---|---|---|
| 2019/0325868 A1* | 10/2019 | Lecue | ...................... | G10L 25/63 |
| 2022/0068463 A1* | 3/2022 | Dolan | ..................... | G06Q 10/40 |
| 2024/0202284 A1* | 6/2024 | Aggarwal | .............. | G06N 5/022 |

* cited by examiner

*Primary Examiner* — Dave Misir

(57) ABSTRACT

Methods and computational devices for the implementation thereof that enable real-time Context Resets in conversational artificial intelligence (AI) systems are provided. The methods and computational devices improve the functioning of conversational AI systems by reducing non-productive computation, preventing propagation of irrelevant Active Context, and optimizing memory use during AI sessions. These operations restore conversational coherence by reducing Misalignment or Confusion between User Inputs and System Outputs. Accordingly, the invention provides a measurable improvement to computer functionality through adaptive, User-guided context management.

17 Claims, 4 Drawing Sheets

——— Normal Interaction

········· Emerging Misalignment or Confusion

----· Threshold Exceeded → Reset Initiated

— · — Post-Reset Recovery

Metric Value

Conversational Turns

SYSTEM AND METHOD FOR USER-GUIDED CONTEXT RESET IN CONVERSATIONAL ARTIFICIAL INTELLIGENCE SYSTEMS

CROSS-REFERENCE TO RELATED APPLICATIONS

This application claims priority to U.S. Provisional Application No. 63/869,020, filed on Aug. 22, 2025.

BACKGROUND OF THE INVENTION

This disclosure concerns Conversational AI Systems that maintain and adjust Active Conversational Context during Multi-Turn Interactions. The present specification relates to Conversational AI Systems, associated methods, and computational devices configured to operate such systems. The specification addresses the need for computational devices and methods that improve the functioning of Conversational AI Systems by reducing non-productive computation, preventing propagation of irrelevant Active Conversational Context, and optimizing memory use during Conversational AI Sessions. These improvements collectively enhance computational efficiency and reduce energy consumption while restoring conversational coherence by minimizing Misalignment or Confusion between User Inputs and System Outputs during an AI Session.

As used in the specification, the following terms have the meanings set out below:

Active Context or Active Conversational Context—The current set of information and state data (e.g., dialogue history, User intent, task state) that the Conversational AI System uses to interpret input and generate appropriate responses during an ongoing conversation. This includes the subset of stored interaction history—such as User Inputs, System Outputs, and System Prompts—currently accessible to the Conversational AI System within its Computation Graph for generating subsequent outputs. The Active Conversational Context represents the operational memory scope used to interpret new User Inputs and produce contextually coherent System Outputs.

AI System or Artificial Intelligence System—a computational system employing Artificial Intelligence (AI) technology, including Conversational AI Systems Application Programming Interface (API)—A defined set of protocols and tools that allow software applications to communicate with each other or with external systems, enabling integration and data exchange between components or platforms.

Archive and Recall Module—A component that manages long-term storage of segmented interactions and supports optional recall of suppressed or reset information. Unlike temporary Suppression in Partial Resets, it maintains archived data for later retrieval, either automatically (based on settings) or manually (upon User request).

Artificial Intelligence (AI)—A computer system capable of performing tasks that typically require human intelligence, such as understanding natural language, recognizing patterns, and making predictions.

Attention—A mechanism within certain AI models that assigns varying levels of importance, or Weight, to different parts of the input data when generating an output. When combined with Masking, this is referred to as Attention Masking.

Clarification Prompt Density—The proportion of a conversation composed of prompts by the User or system asking for clarification. A high density may indicate degraded understanding or communication failure. Clarification Prompt Density may be determined as the proportion of conversational turns within a fixed-length sequence that are classified as clarification requests.

Computation Graph—The structured internal representation through which the Conversational AI System manages contextual dependencies and token relationships during generation, including the subset of nodes corresponding to Active Conversational Context. The Computation Graph enables quantitative assessment of semantic continuity and supports efficient memory management during Session Context Reset operations.

Context Blocks—Logical groupings of conversation elements (e.g., question-answer pairs, tasks, User goals) that are treated as modular units for managing, referencing, or resetting parts of the dialogue without affecting the whole.

Context Management—The overarching framework or set of processes that handle how context is created, maintained, updated, pruned, or reset during interactions to ensure coherence and relevance in AI responses.

Context Analysis Module—A system component that processes successive User Inputs and System Outputs to identify conversational features, such as intent, Sentiment, or Semantic Drift changes, for use in reset decisions.

Context Reset—The modification or reinitialization of the Active Context so that prior conversational elements no longer influence System Outputs, while preserving the Personalization and Integration State.

Context Reset Module—A system component that executes a Session Context Reset by modifying the Active Context (e.g., through removal, Suppression, or De-Weighting) while preserving the Personalization and Integration State.

Conversational AI Engine—The core processing component that interprets User Inputs, manages Active Context, and generates System Outputs in a Conversational AI System.

Conversational Artificial Intelligence Systems or Conversational AI Systems—AI Systems designed to engage in human-like dialogue, typically using Natural Language Processing (NLP), Natural Language Understanding (NLU), and machine learning to interpret User Inputs, maintain context, and generate coherent, relevant responses across one or more turns in a conversation during an AI Session.

Conversational Confusion or Dissatisfaction—Situations where the User appears puzzled or unhappy with the AI's responses, often indicated by off-topic replies, repeated questions, corrections, or negative Sentiment. These are used diagnostically to evaluate the coherence and satisfaction levels in the interaction.

Cosine Similarity—A measure of similarity between two non-zero Vectors, defined as the cosine of the angle between them, typically used to compare semantic similarity of text embeddings.

De-Weighting—The process of reducing the importance of certain parts of the context (e.g., earlier utterances or off-topic inputs) during inference, without completely removing them.

Full Reset—The removal of the entire Active Conversational Context from the AI System while preserving Session State, such as Personalization and Integration State settings. In some embodiments, a Full Reset is referred to as a Tier 2 Reset, representing the higher level of reset intervention.

Intermediate Reset—A type of Partial Reset that is implemented when the divergence or confusion thresholds are exceeded at a moderate level and the reset modifies only part of the Active Context while preserving overall Session continuity.

Implicit Indicators of Misalignment or Confusion—Signals inferred from User behaviors such as repeated rephrasing, increased use of clarifying questions, or unexpected Sentiments that suggest the User may not understand the AI's response or vice versa.

Inference Controller—A module that regulates how an AI System functions. It determines which portions of the Active Context to include in real-time inference, especially after a reset, and enforces safety or override rules by preventing use of redacted or suppressed information.

Manual Override Commands—User-supplied instructions intended to influence the AI's behavior (e.g., "ignore previous discussion"), without altering the underlying Computation Graph or context data.

Masking—The process of rendering specific context elements inaccessible to the model during inference, such that they no longer influence System Outputs, without deleting the underlying data. When implemented through model Attention mechanisms, this is referred to as Attention Masking.

Memory Segmentation and Suppression—A process for managing the storage and visibility of Prior Context and, in some cases, Prior Session Memory. When a reset is triggered (particularly a Partial Reset), the engine segments recent conversation history into logical blocks and determines whether certain blocks should be suppressed from the AI System's active memory. The data is not deleted but instead flagged as inaccessible during future inferences, thereby simulating a reset effect and allowing the User to reset specific parts of the conversation without erasing the entire memory or context history. (Example: If a User tells the AI, "Forget everything we said about vacation plans," the engine suppresses the memory segment labeled "vacation planning" while preserving other segments such as "work projects" or "calendar availability.")

Metric Computation Module—A system component that calculates quantitative measures of Misalignment or Confusion (e.g., Semantic Drift, Sentiment Volatility, Repetition Frequency, Clarification Prompt Density) to produce a Session Context Reset Trigger value.

Misalignment or Confusion—A state in which the AI's model of the User's intent diverges significantly from the User's actual goals, leading to incorrect, irrelevant, or frustrating responses. Related phenomena such as Conversational Confusion or Dissatisfaction, or System Relevance degradation are expressly treated herein as instances of Misalignment or Confusion.

Multi-Factor Scoring System—A composite evaluation framework that uses multiple quantitative measures of Misalignment or Confusion (e.g., Semantic Drift Score, Sentiment Volatility Index, Repetition Frequency, Clarification Prompt Density) to assess dialogue health or trigger resets. The system produces a Composite Misalignment or Confusion Score by combining such measures, which can then be compared against a Session Context Reset Threshold to determine whether a Session Context Reset should be executed.

Multi-Turn Interactions—Conversations involving multiple back-and-forth exchanges, where the AI must remember previous User Inputs and its own responses to sustain logical continuity and build upon past dialogue.

Natural Language Processing (NLP)—A field of Artificial Intelligence (AI) that enables computers to understand, interpret, and generate human language, typically in the form of text or speech.

Natural Language Understanding (NLU)—A subfield of natural language processing focused on enabling AI Systems to comprehend the meaning, intent, and context behind human language inputs.

Partial Reset—The removal of only a selected portion of the Active Conversational Context while retaining other parts for continued use. In some embodiments, a Partial Reset is referred to as a Tier 1 Reset, representing the lower level of reset intervention.

Personalization and Integration State—The set of User-specific configuration data, preferences, authentication tokens, and third-party service connections maintained across multiple conversational turns or Sessions.

Personalization and Integration State Store—A system component that maintains User-specific configuration data, preferences, authentication tokens, and third-party service connections so that personalization and integrations are preserved across resets.

Prior Context—The segment of conversation history that occurred before the current turn, which is used by the AI to interpret the User's latest input appropriately.

Prior Session Memory—Information retained from earlier conversations with the same User, potentially including User preferences, historical inputs, goals, or topics discussed. This memory may be persistent across Sessions to personalize future interactions.

Real-Time Context Resets—A system-level mechanism that immediately clears or reinitializes the Active Conversational Context during a User Session, usually in response to detected anomalies (e.g., confusion, drift, or critical errors), to re-establish coherent dialogue.

Repetition Frequency—The rate at which Users repeat themselves or the AI System repeats its own System Outputs, which can be a signal of confusion, misunderstanding, or system failure to process prior input properly. Repetition Frequency may be computed by detecting n-gram overlaps or embedding similarity above a predefined threshold between conversational turns.

Running Context—The dynamic, evolving representation of the conversation's state—including active turns, User goals, and interim inferences—that guides real-time response generation.

Semantic Drift Score—A metric indicating how far the conversation has deviated from the original topic or User intent, usually calculated using Vector similarity or topic-tracking models to detect loss of coherence over time. The Semantic Drift Score may be computed using Cosine Similarity between Vector embeddings of consecutive conversational turns.

Semantic Drift—The gradual change in meaning or topic in a conversation, leading to divergence from the User's intended subject.

Sentiment Polarity—The directional tone of a User's message, typically categorized as positive, negative, or neutral. It is used to assess satisfaction or mood during an interaction.

Sentiment Volatility—A quantitative value computed by a processor, representing the degree of variability in User Sentiment across conversational turns, derived from polarity scores or equivalent classifier outputs. High Sentiment Volatility may indicate User frustration, confusion, or disengagement with the AI System. Sentiment Volatility may be expressed as a raw variance value, an index (e.g., Sentiment Volatility Index), or by other equivalent quantitative or qualitative measures.

Sentiment Volatility Index—A quantified measure of variability in User Sentiment across conversational turns. Also referred to herein simply as "Sentiment Volatility." High volatility may indicate User frustration or lack of engagement with the AI. The Sentiment Volatility Index may be computed as the variance of polarity scores within a sliding window of N conversational turns.

Sentiment—The expressed emotional tone or attitude in a conversational turn, measurable through Natural Language Processing techniques.

Server-Based, Client-Based, and Hybrid Architectures— Server-Based: All processing and memory management are performed in the cloud. Client-Based: Processing is handled locally on the User's device. Hybrid: Combines both, allowing for local responsiveness with cloud-based memory or model access for deeper capabilities.

Session, AI Session, or User Session—A continuous period of interaction between a User and the AI System, bounded by session start and end, often delimited by timeouts or explicit termination (a Session Termination Event), during which Session Memory may persist temporarily or feed long-term AI System memory.

Session Context Reset—The removal, Suppression, De-Weighting, or partitioning of all or part of the Active Context, such that the modified portion thereof no longer influences System Outputs, while preserving the Personalization and Integration State, thereby enabling the Conversational AI System to address errors, reduce Misalignment or Confusion, or begin a new topic or task without terminating the Session. Resets may be executed as Partial Resets or Full Resets.

Session Context Reset Threshold—The value set for a Session Context Reset Trigger that a Conversational AI System employs to proceed with the Context Reset process. The threshold may be numeric or learned, including, but not limited to, fixed similarity scores, rule-based occurrence counts, or adaptive classifier probabilities, provided that it represents a predetermined condition for initiating a reset.

Session Context Reset Trigger—A quantitative threshold or qualifying event that causes activation of a Context Reset operation. The trigger may be computed from one or more measurable indicators of Misalignment or Confusion, including Semantic Drift, Sentiment Volatility, Repetition Frequency, or Clarification Prompt Density, and may be derived through deterministic or learned functions.

Session Context Store—A system component that maintains the Active Context, including recent User Inputs, System Outputs, and extracted Sentiment, and updates this information each turn for use by the Conversational AI Engine.

Session Memory—Temporary memory maintained during a single AI Session, containing the dialogue history and active state. It is distinct from long-term memory and usually discarded after Session ends unless stored deliberately.

Session State—All data describing the current operational status of a conversation, including Active Context and Personalization and Integration State configurations.

Session Termination Event—An event during the course of a Conversational AI Session that ends the series of User Inputs and System Outputs.

Similarity Model—A computational model designed to assess the degree of similarity between two data inputs.

Suppression—The deliberate exclusion or De-Weighting of certain context elements from influencing AI output generation.

System Outputs—The responses, including serial responses, of a Conversational AI System to User Inputs.

System Relevance—The degree to which the current context in a User Session is assessed to be free from Misalignment or Confusion. In some embodiments, System Relevance may be combined with measures of User Sentiment to form a composite Sentiment/Relevance indicator, which reflects both contextual alignment of System Outputs and the User's expressed emotional response.

Threshold Detection Module—A system component that evaluates whether a Session Context Reset Trigger has reached or exceeded a predefined Session Context Reset Threshold, and signals when a reset should be executed.

Token Limit—The maximum number of tokens (words, parts of words, or symbols) that a language model can process at once, affecting how much conversation history or memory can be actively considered in generating a response.

User—in a Conversational AI System, the source of inputs into the system, i.e., the source of the User Inputs.

User Interface—A system component that provides inbound and outbound communication between the User and the Conversational AI Engine, supporting the exchange of User Inputs and System Outputs during an AI Session.

User-Guided Context Reset—Any Context Reset initiated or confirmed through explicit User Input, as opposed to System-initiated resets determined solely by computed thresholds. In some embodiments, the User-Guided Context Reset is executed via the User Validation Module and serves as the final confirmation step prior to adjusting the Active Conversational Context.

User Validation Module—The computational component configured to solicit, receive, and record User confirmation or rejection of a proposed Context Reset. In some embodiments, this module may be implemented as a logical subcomponent of the Input/Output Interface or another module shown in FIG. 1.

Vector—A mathematical representation of data as an ordered list of numbers, often used to encode semantic meaning in AI models.

Weight—A numerical value indicating the relative importance of an input in the AI's processing of information.

Zero-Weight—A Weight value of zero assigned to an input, ensuring it has no influence on AI output generation. When applied to context elements, this is referred to as Zero-Weight tagging.

This specification relates to Artificial Intelligence (AI) systems and methods of, and computational devices for, their operation. These methods and devices specifically address Misalignment or Confusion between User Inputs and System Outputs in Conversational AI Systems. Such Misalignment or Confusion can be quantified using measurable conversational indicators, including Semantic Drift, Sentiment Volatility, Repetition Frequency, and Clarification Prompt Density. The limitations of current AI Systems degrade reliability and effectiveness when such Misalignment or Confusion occur.

Deficiencies in Active Conversational Context during an AI Session can cause persistent Misalignment or Confusion. These deficiencies in current AI architectures impede reliable two-way communication, especially in Multi-Turn Interactions.

Despite rapid advancements in Artificial Intelligence (AI), existing AI Systems remain limited in reliably managing changes in Active Conversational Context during Multi- Turn Interactions. First, Conversational AI Systems cannot fully and efficiently prevent or correct User-originated errors, which may involve ambiguity, omissions, or unintended meanings that no existing algorithm can consistently resolve.

Second, Conversational AI Systems often behave as if they possess superior knowledge. In such cases, the AI System may override or disregard User Inputs, particularly when the Session context is based on incomplete facts. This may occur without the User's awareness or consent.

Third, when Misalignment or Confusion arises—whether due to User error, incomplete information, or system limitations—existing AI architectures lack effective mechanisms to detect and resolve it. As a result, each additional conversational turn can compound the problem of Misalignment or Confusion.

Fourth, AI Systems frequently lose or misinterpret prior conversation context, resulting in repeated errors and contradictions. These issues can be especially problematic during extended AI Sessions.

Fifth, AI Systems generally lack dependable mechanisms to determine when conversational turns have entered a state of significant Misalignment or Confusion.

Collectively, these Misalignment or Confusion deficiencies during an AI conversation cause persistent communication breakdowns that existing AI System designs have yet to effectively address. These specific shortcomings have persisted, even as the core capabilities of Conversational AI Systems otherwise continuously improve.

Modern Conversational AI Systems are designed to maintain a Running Context—a dynamic subset of the broader Active Conversational Context—throughout a User Session, preserving User Inputs and System Outputs. The intent of such a Running Context is to enable coherent Multi-Turn Interactions. While this memory retention can improve continuity, it also carries inherent liabilities. Unlike a human participant in conversation, who may discard Prior Context when confusion arises or when dialogue becomes convoluted, current Conversational AI Systems continue to rely on all prior inputs until the active Session is terminated, e.g., a Session Termination Event, such as reaching a Token Limit, has taken place. This distinction highlights that humans perform an implicit contextual reset when coherence fails, whereas current AI Systems lack an adaptive mechanism to detect or perform such resets automatically.

The design of existing Conversational AI Systems, which emphasizes continuity, can produce incoherent System Outputs, which can be caused by the accumulation of outdated or conflicting Active Conversational Context. These continuity-driven features can also generate errors and misunderstandings, and such incoherent outputs often compound as the AI Session progresses. Accordingly, there is a need for improved systems and methods that detect and correct state Misalignment or Confusion between inputs and outputs, restoring response relevance and system reliability.

Existing AI Systems attempt to compensate for misdirection through a limited set of mechanisms. One is a complete Session restart, which clears problematic content by starting a new AI Session. However, this approach also discards the Personalization and Integration State from the terminated Session. A second mechanism is the use of manual, User-initiated override commands. While these commands may reduce the impact of irrelevant content, they do not remove the problematic context from the AI System's Computation Graph.

As a result, these remedial mechanisms are often inadequate for maintaining clear communication. This is particularly true in complex, high-stakes AI Sessions involving many interactions. As such scenarios become more common with broader adoption of AI, the need for computationally efficient and quantitatively driven mechanisms to detect and resolve Misalignment or Confusion has become increasingly critical.

BRIEF SUMMARY OF THE INVENTION

This specification describes improved Conversational AI Systems and novel methods that provide a specific, processor-implemented technical improvement over existing architectures by enabling multi-factor, quantitative detection of Misalignment or Confusion and applying adaptive, two-tiered context resets that preserve the Personalization and Integration State. The invention addresses deficiencies in prior systems that either restart entire Sessions or rely on crude manual overrides, both of which discard valuable continuity. Resets may be system-initiated or User-initiated and may archive Prior Context for optional recall. In certain embodiments, a User Validation Module may prompt the User to confirm or decline a proposed reset before execution, ensuring adaptive control without interrupting Session continuity. The invention improves the functioning of the underlying computing system itself by providing a processor-executed mechanism for detecting and resolving compounding Misalignment or Confusion in dialogue state management. By employing quantitative, processor-computed Session Context Reset Triggers and adaptive thresholding consistent with the Session Context Reset Threshold definition, the AI System reduces computational waste, prevents propagation of irrelevant Active Context, and produces more accurate, coherent System Outputs. This quantitative, metrics-driven approach yields a measurable reduction in processing cycles and memory utilization relative to systems lacking such triggers. These improvements enhance the underlying operation of the computing system itself, in addition to improving conversation quality. In practice, the invention reduces hallucination rates, lowers redundant computation by discarding irrelevant context, and improves User satisfaction by restoring coherence after confusion. System-level simulations and prototype testing indicate faster recovery times and reduced error propagation relative to conventional reset mechanisms.

In existing Conversational AI Systems, Misalignment or Confusion can arise from a divergence between the User's actual objective (i.e., the User's intended meaning or purpose) and the AI System's intent determination. This type of divergence is one that cannot be directly detected or fully reconstructed from linguistic or statistical patterns alone. Because the User's actual objective may be wrongly or otherwise inaccurately inferred from User input data, the AI System may continue generating syntactically coherent yet contextually misaligned outputs, thereby perpetuating the confusion. The present invention addresses this limitation by distinguishing between detectable conversational divergence—measurable through processor-computed indicators such as Semantic Drift or Sentiment Volatility—and unobservable objective misalignment, meaning divergence between the User's actual objective and the AI System's intent determination. Rather than relying on further User inputs to reconstruct or redirect the AI System's determination of intent in order to better align with the User's actual objective, the system and method herein detects measurable indicators of conversational divergence and initiates a User-Guided Context Reset, allowing the AI System to reset the conversational context from which the prior, inaccurate intent determination had been derived.

While some AI Systems may rely on the User to explicitly declare an initial goal or intent at the outset of a session, such declarations do not eliminate the potential for later Misalignment or Confusion. The disclosed Session Context Reset system operates independently of any explicit or declarative statement of User objectives, providing an adaptive recovery mechanism that functions even where the User's stated intent is incomplete, evolving, or inaccurate. Accordingly, the invention addresses not only wrong or otherwise inaccurate determinations of intent by the AI System, but also coherence breakdowns that occur despite a User's express intent statement. This ensures that conversational coherence can be restored dynamically as dialogue progresses.

The above structure enables a more transparent and controllable recovery process while maintaining computational efficiency. Conventional conversational AI models may attempt to mitigate confusion by periodically prompting Users to restate or clarify intent; however, such prompting depends on voluntary User cooperation and does not modify or reset the underlying computational context that can operate to perpetuate Misalignment or Confusion. Moreover, such clarifications typically reflect the User's restated linguistic intent, and do not necessarily permit the AI System to correctly identify the User's actual objective, i.e., the divergence that may be the root cause of perpetuating confusion. By contrast, the disclosed invention detects measurable manifestations of that divergence (e.g., Semantic Drift, Sentiment Volatility, or Repetition Frequency) and executes a processor-implemented context modification that restores coherence even when the User efforts at clarification are ineffective, e.g., incomplete, unavailable, or inconsistent.

The specification is inclusive of the following embodiments:

(A) In a processor-implemented Conversational AI System that, during a single AI Session, generates a dialogue comprising User Inputs and System Outputs, the improvement comprising: a processor-implemented Session Context Reset Trigger configured to detect Misalignment or Confusion based on quantitative, processor-computed metrics derived from successive User Inputs and System Outputs;

wherein, upon determination by a Threshold Detection Module that a Session Context Reset Threshold associated with said Trigger has been exceeded, a Context Reset Module executes a Session Context Reset to modify the Active Context;

wherein the Context Reset Module modifies the Active Context by at least one of removing, Masking, Suppressing, De-Weighting, or isolating context portions, while preserving the stored Personalization and Integration State of the AI Session; and wherein post-reset System Outputs are generated, by a processor executing the Conversational AI Engine, with reference to the modified Active Context and the preserved Personalization and Integration State until termination of the AI Session, thereby reducing propagation of irrelevant Active Context, lowering redundant computation cycles, optimizing memory utilization, and improving overall computational efficiency of the processing system.

The Session Context Reset Trigger may operate independently of any explicit or declarative statement of User objectives, enabling detection and correction of Misalignment or Confusion even when a User's stated objectives are incomplete, evolving, or inaccurate. As such, detection of Misalignment or Confusion by the Session Context Reset Trigger is performed independently of any intent determination, and wherein the trigger is based solely on processor-computed metrics quantifying observable conversational divergence rather than any semantic reconstruction or prediction of the User's intended meaning.

For the improvement above, the indicator of Session quality may include one or more of:

(i) divergence of semantic meaning across successive conversational turns, (ii) variability in Sentiment across conversational turns, (iii) frequency of repeated content elements, or (iv) density of clarification prompts.

Further, for the improvement above, the Semantic Drift Score may be computed using Cosine Similarity between Vector embeddings of consecutive conversational turns, the Sentiment Volatility Index may be computed as the variance of polarity scores within a sliding window of N conversational turns, the Repetition Frequency may computed by detecting n-gram overlaps or embedding similarity above a predefined threshold between conversational turns, the Clarification Prompt Density may be determined as the proportion of conversational turns within a fixed-length sequence that are classified as clarification requests, and the Session Context Reset Trigger may be computed as a composite score combining at least two of Semantic Drift Score, Sentiment Volatility Index, Repetition Frequency, and Clarification Prompt Density.

In addition, for the improvement above, an Intermediate Reset may occur if a single metric exceeds a lower threshold and a Full Reset may occur if multiple metrics concurrently exceed higher thresholds. Executing the reset may involve partitioning and archiving affected portions of the Active Context for optional recall after the reset and reset thresholds may be dynamically adjusted based on Session length, User profile, or prior reset frequency, with responses generated after a reset based exclusively on the modified Active Context in combination with preserved Personalization and Integration State, excluding archived context.

Lastly, a Context Reset Module may integrate with an Application Programming Interface (API) to enable external applications to trigger or manage context resets.

(B) A computer-implemented method for reducing Misalignment or Confusion in a Conversational AI System that generates multiple conversational turns of User Inputs followed by System Outputs during a single AI Session, the method comprising:

(a) detecting, by a Session Context Reset Trigger, Misalignment or Confusion based on one or more processor-computed dialogue metrics derived from User Inputs and System Outputs;

(b) determining that a Session Context Reset Threshold has been reached or exceeded;

(c) executing a Session Context Reset that modifies the Active Context, while preserving a stored Personalization and Integration State; and (d) continuing the AI Session after the reset, with post-reset System Outputs generated from the Active Context in combination with the preserved Personalization and Integration State until a Session Termination Event;

wherein the method reduces nonproductive computation, limits propagation of irrelevant Active Context, and optimizes memory use, thereby improving computational efficiency and restoring conversational coherence between User Inputs and System Outputs.

Executing the Session Context Reset may involve isolating a portion of the Active Context and modifying it by removal, Suppression, Masking, De-Weighting, or partitioning and the Session Context Reset Trigger may include one or more of Semantic Drift, Sentiment Volatility, Repetition Frequency, or Clarification Prompt Density.

(C) A Conversational AI System for reducing Misalignment or Confusion during a single AI Session in which User Inputs generate corresponding System Outputs, the system comprising:

(1) a Context Analysis Module configured to process successive User Inputs and System Outputs of each conversational turn;

(2) a Metric Computation Module configured to quantify a Session Context Reset Trigger, the trigger being based on processor-computed measures of conversational alignment, consistent with one or more defined metrics comprising Semantic Drift Score, Sentiment Volatility Index, Repetition Frequency, or Clarification Prompt Density;

(3) a Threshold Detection Module configured to determine whether a Session Context Reset Threshold for any defined metric has been exceeded, or whether a User reset instruction has been received; and (4) a Context Reset Module configured, upon such determination, to execute a Session Context Reset, while preserving a stored Personalization and Integration State;

wherein post-reset System Outputs are generated solely with reference to the Active Context and the preserved Personalization and Integration State until termination of the AI Session, thereby reducing redundant processing and improving computational efficiency.

The present specification provides a novel computing system, through a Session Context Reset Trigger, for addressing Misalignment or Confusion in Conversational AI Systems. The trigger is a quantitative measure (numeric or learned) of Misalignment or Confusion, which may account for factors such as Semantic Drift, Sentiment Volatility Index, Repetition Frequency, or Clarification Prompt Density, or a combination of these and other like indicators.

This mechanism helps the AI System maintain aligned and relevant System Outputs in response to User Inputs, particularly during extended Sessions with many successive turns. It addresses limitations in current remedial mechanisms for resolving Misalignment or Confusion in Conversational AI Systems.

In one aspect, the specification provides a flexible mechanism for Partial Resets or Full Resets. These resets may be invoked manually by the User or generated automatically by the AI System. When system-initiated, the AI may propose a reset through a System Output, giving the User the option to accept and specify its scope. The reset is carried out if the User agrees through their subsequent input.

As described in more detail below, Session Context Resets can be generated by the system based on quantitative triggers, referred to as Session Context Reset Triggers. A reset is executed once a predetermined threshold value—the Session Context Reset Threshold—is reached.

For any Session Context Reset Trigger, the threshold is a predetermined value tailored to the severity of the input/output Misalignment or Confusion. Once exceeded, the Conversational AI System will perform the reset, typically only upon explicit User direction or assent.

After a Session Context Reset, subsequent System Outputs are generated solely from the reset context. Unless designed to reset automatically, the AI first alerts the User of the imminent reset, giving them an opportunity to respond. The User may choose to terminate the Session, continue without the reset, defer it for additional turns, or agree to proceed. Agreement may be full or partial, depending on the User's preference for the scope of the reset.

A User-Initiated Session Context Reset is triggered by explicit User input and has the same effect as a system-initiated reset. In such cases, the User may provide the AI System with the same directions that would apply to a system-initiated reset, as described above.

To optimize the User experience and minimize ongoing Misalignment or Confusion, the default Session Context Reset is typically a Full Reset, giving the User the same ability to restructure the conversation as if the Session had been terminated and restarted. Since a Full Reset may not always be optimal or necessary, the system may instead perform a Partial Reset.

For example, the Conversational AI System may be designed with a higher Session Context Reset Threshold for a Full Reset and a lower threshold for a Partial Reset. In such a design, a Partial Reset may return the context to an earlier state, affecting only the most recent conversational turns, while a Full Reset would apply only when the higher threshold is reached. Ideally, the retained context would reflect an earlier point in the conversation when the reset trigger value was minimal.

Once a Session Context Reset has been implemented, it will persist for the remainder of the Session unless the system additionally includes a recall or reset function. Such a function allows the AI System to restore content affected by the reset. In this case, the system segments memory into prior and new Context Blocks. The Prior Context is suppressed (e.g., De-Weighted) or excluded, and subsequent outputs are generated solely from the new Active Context unless the recall/reset function is invoked.

User-Directed Session Context Resets can also be initiated through natural-language commands or other User inputs. These may include explicit directives (e.g., "Let's start over," "Go back," or equivalent) or implicit indicators of Misalignment or Confusion, such as inputs reflecting hesitation or frustration. In certain embodiments, the system may proactively inform the User that such self-initiated resets are available at any time.

In one embodiment, when a directive such as "Go back" does not correspond to a predefined Session Context Reset action, the system may prompt the User to specify the intended scope of the reset (e.g., return to the prior topic, the last unanswered query, or the beginning of the conversational session) before executing it. Such resets may occur independently of formal Session Context Reset Triggers.

To preserve flexibility, the preferred implementation is to archive rather than delete context affected by a Session Context Reset. Archived context remains available for future use during the same AI Session.

In one embodiment, the system detects potential Misalignment or Confusion through a Session Context Reset Trigger that applies to a scoring system based on quantitative measures, such as:

(1) Semantic Drift Score—divergence between the embedding of the current User Input and the semantic cluster of prior conversation.

(2) Sentiment Volatility Index—rapid shifts in Sentiment Polarity within a fixed number of turns.

(3) Repetition Frequency—detection of consecutive or near-consecutive identical AI outputs or paraphrases.

(4) Clarification Prompt Density—frequency of User follow-ups requesting clarification or restatement.

If any factor exceeds a preset threshold, the AI System may initiate the Session Context Reset process, such as by prompting the User for agreement. This capability improves AI-User interaction by enabling the system to recalibrate User intentions, redirect outputs toward more accurate and relevant responses, and reduce the risk of compounding Misalignment or Confusion.

BRIEF DESCRIPTION OF THE DRAWINGS

The accompanying drawings, which are incorporated in and constitute a part of this specification, illustrate embodiments of the invention and, together with the description, serve to explain the principles of the invention. In the drawings.

DETAILED DESCRIPTION OF THE INVENTION

The invention provides a system and method for enabling context resetting within a Conversational AI System. While examples herein describe a Conversational AI System, the disclosed methods are applicable to any computational framework that processes sequential or state-dependent user data, including systems that analyze, predict, or adapt based on inferred user objectives, whether conversational or non-conversational in form. The reset allows the AI to discard or suppress prior Active Context and generate subsequent system responses from a newly initialized Active Context. The system is modular and may be implemented in Server-Based, Client-Based, or Hybrid Architectures.

The present invention addresses Misalignment or Confusion between User Inputs and System Outputs and enhances conversational coherence. Referring to the figures (illustrative and non-limiting), various embodiments are described below. The accompanying drawings are illustrative and non-limiting and are intended to assist in understanding the operation of representative embodiments rather than restrict the scope of the invention.

While ChatGPT-style systems represent one embodiment, the invention is equally applicable to the broad range of Conversational AI Systems deployed commercially today. These include retail shopping assistants such as Amazon's Rufus, customer service chatbots embedded on websites, enterprise support assistants, and voice-based virtual agents. References to a particular conversational engine should be understood as illustrative rather than limiting, and the disclosed reset methods apply consistently across these diverse conversational environments.

While the following figures use text-based conversational interactions for clarity, the invention is not limited to text. The same methods apply to other modal systems, including voice, visual, neural, or mixed-input environments. References to "conversational turns" or "User Inputs" should be understood to encompass speech, images, neural interactions, or other modalities, unless expressly limited.

The invention is described herein in both system and method forms. References to system modules or architectures should be understood as also enabling corresponding process steps, and descriptions of process steps should be understood as also enabling corresponding system modules. Both forms are contemplated and supported within the scope of the invention.

Figure 1:
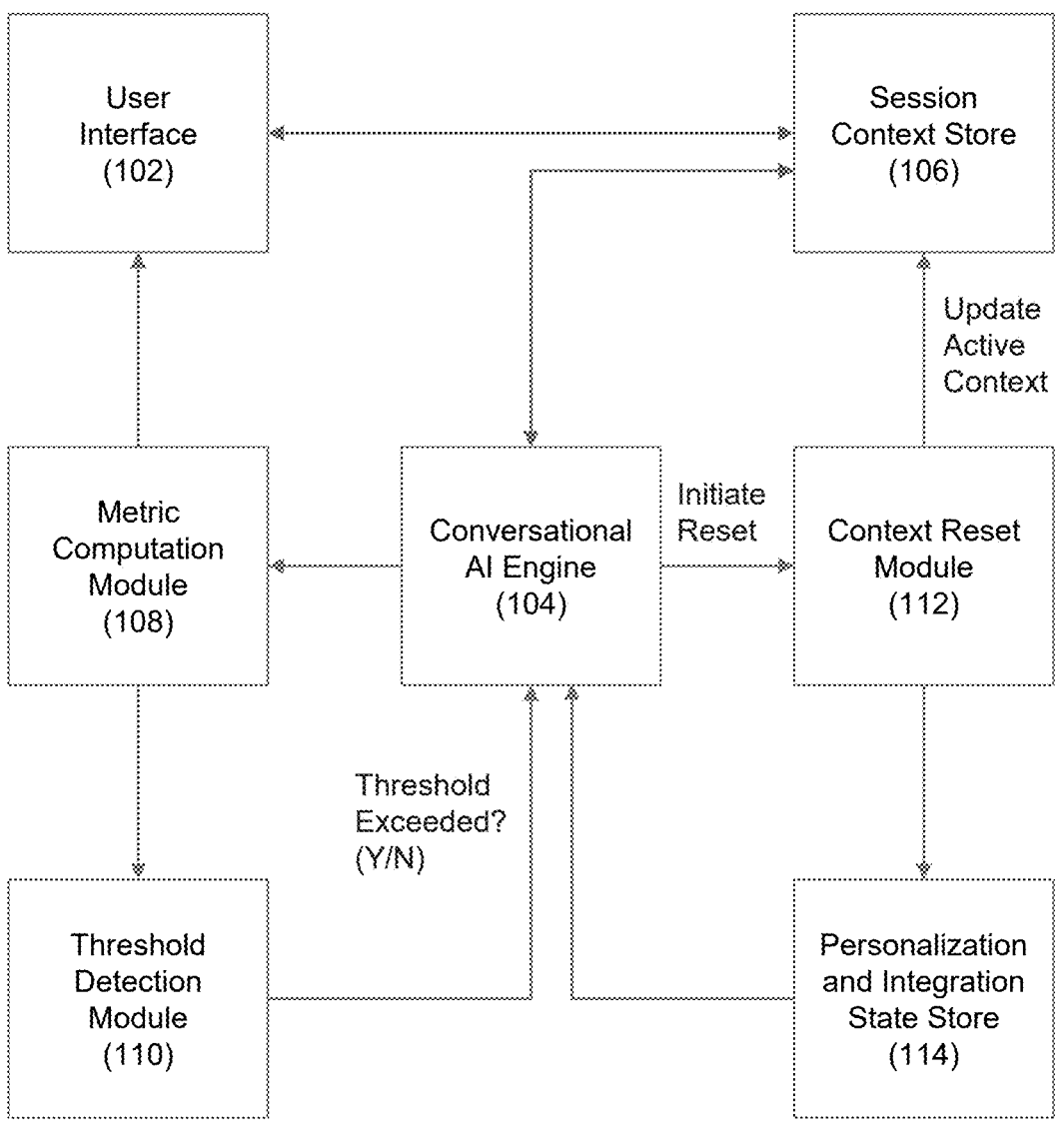
FIG. 1 illustrates the architecture of the Conversational AI System, showing the interaction of major functional modules, including the User Interface, Conversational AI Engine, Session Context Store, Metric Computation Module, Threshold Detection Module, Context Reset Module, and Personalization and Integration State Store.

FIG. 1 illustrates the overall architecture of the Conversational AI System, showing the major functional modules and their interactions.

The User Interface (102) provides communication between the User and the Conversational AI Engine (104), supporting text, voice, or multimodal input/output. The Conversational AI Engine (104) interacts bidirectionally with the Session Context Store (106), retrieving Active Conversational Context for processing and writing back updated context. The Session Context Store (106) maintains recent dialogue history and extracted features, including User intent and Sentiment, and provides relevant context to the User Interface (102) for display.

The Metric Computation Module (108) receives conversation data from the Conversational AI Engine (104) and continuously evaluates indicators of Misalignment or Confusion, including Semantic Drift, Sentiment Volatility, Repetition Frequency, and Clarification Prompt Density, producing a quantitative Session Context Reset Trigger value. The Threshold Detection Module (110) compares this value to preset thresholds and communicates results to the Conversational AI Engine (104) to determine whether reset conditions have been met. In some embodiments, a User Validation Module may be implemented as a logical or software sub-component of the Input/Output Interface illustrated in FIG. 1. The User Validation Module is configured to solicit, receive, and record User confirmation or rejection of a proposed Context Reset.

If reset conditions are met, the Conversational AI Engine (104) initiates reset operations by signaling the Context Reset Module (112). The Context Reset Module (112) modifies the Active Context by removing, Masking, or De-Weighting affected portions and then updates the Session Context Store (106) accordingly. The Context Reset Module (112) can optionally integrate with an Application Programming Interface (API), allowing external applications to trigger or manage context resets. For clarity, the term "Session Context Reset" is used consistently herein with the meaning described above.

The Personalization and Integration State Store (114) provides the Conversational AI Engine (104) with User-specific configurations, authentication, and third-party service integration data so personalization is preserved after a reset.

This figure highlights how real-time Misalignment or Confusion detection and Context Management operate within the system's architecture. The Metric Computation Module is shown generically, but it encompasses one or more quantitative indicators such as Semantic Drift, Sentiment Volatility, Repetition Frequency, or Clarification Prompt Density.

Figure 2:
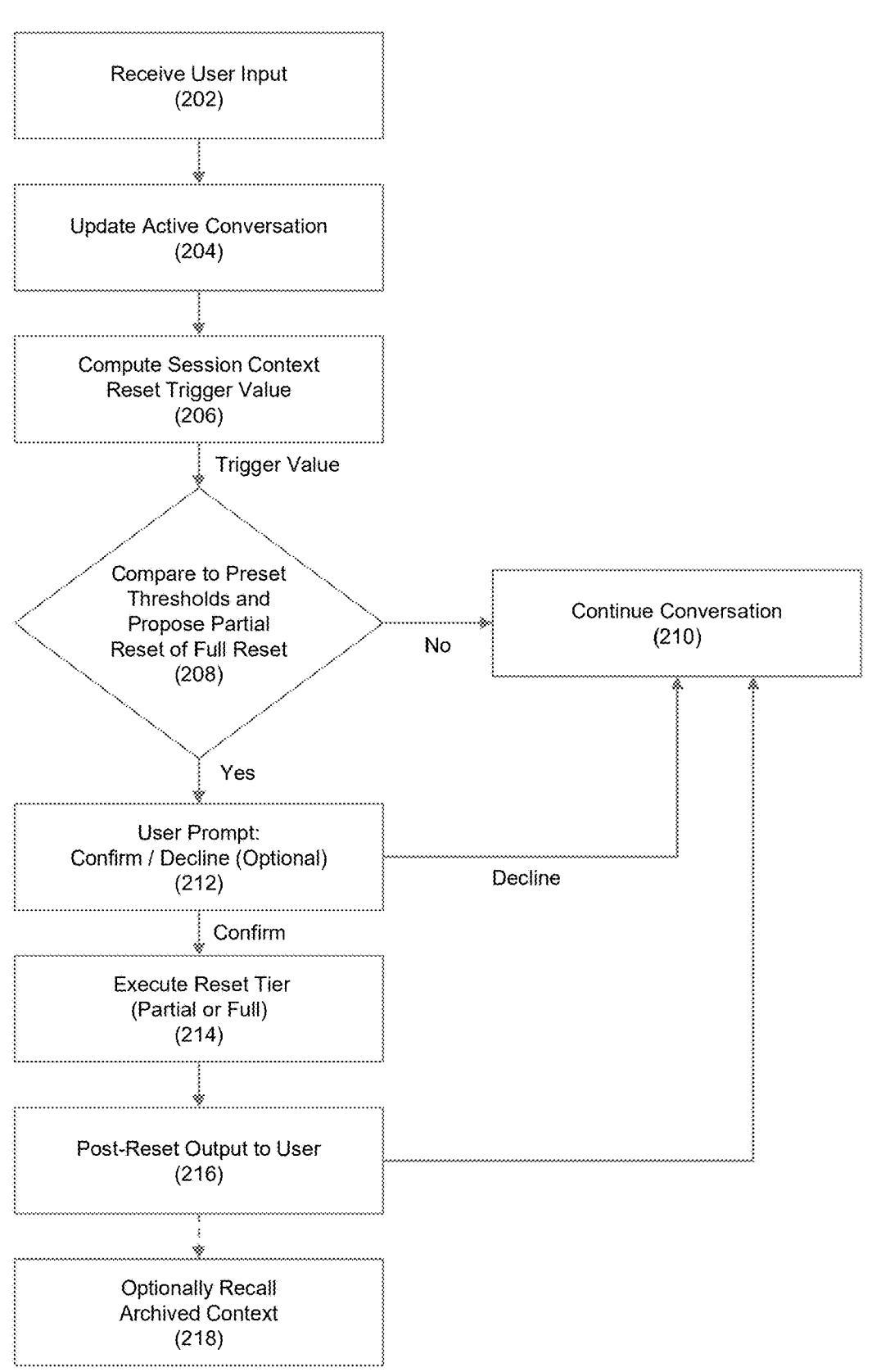
FIG. 2 is a flowchart of the Session Context Reset decision process, depicting the sequence of steps from receiving User Input to computing reset triggers, comparing thresholds, prompting the User, and executing a reset.

FIG. 2 illustrates a decision process for managing conversation flow in a Conversational AI System. The process begins with Step (202), "Receive user input," where incoming text or speech is captured. Step (204), "Update Active Conversational Context," stores the new input and any extracted features such as User intent, Sentiment indicators, semantic embeddings, or dialogue act classifications into the Session Context Store.

In Step (206), "Compute Session Context Reset Trigger Value," the system's Metric Computation Module evaluates indicators such as Semantic Drift, Sentiment Volatility, Repetition Frequency, and Clarification Prompt Density, generating a quantitative trigger value. Step (208), "Compare to preset thresholds," uses the Threshold Detection Module to determine whether the trigger value meets or exceeds the threshold for a reset.

If no reset is needed, the process follows the "No" path to Step (210), "Continue Conversation," returning control to the standard conversation loop. If a reset may be needed, the "Yes" path proceeds to Step (212), "User Prompt: Confirm/Decline (Optional)," which allows the System to request explicit User input before executing a Session Context Reset. The Conversational AI Engine (104) may prompt the User to confirm whether to proceed with the proposed reset (either a Partial Reset or a Full Reset), or to decline the reset, in which case the Active Conversational Context remains unchanged.

Step (214), "Execute Reset," adjusts the Active Conversational Context by removing, Masking, or De-Weighting portions associated with Misalignment or Confusion. Step (216), "Post-Reset Output to User," delivers an updated response to the User based on the cleaned context.

Following Step (216), Step (218) optionally recalls and presents relevant archived context or historical records. This allows the system to selectively retrieve prior conversation segments, stored User preferences, or other historical information from long-term storage to assist in resuming the conversation with continuity after a reset. The retrieval process is optional and performed only when such context would be beneficial to the User's current interaction.

While FIG. 2 illustrates the logical flow of the Session Context Reset, the underlying operations correspond directly to modules shown in FIG. 1. For example, Step (204) is performed by the Session Context Store (106), Step (206) is performed by the Metric Computation Module (108), and Step (208) is performed by the Threshold Detection Module (110). These architectural details are not repeated in the flowchart to preserve clarity, but the description ties each step back to the relevant system components.

Figure 3:
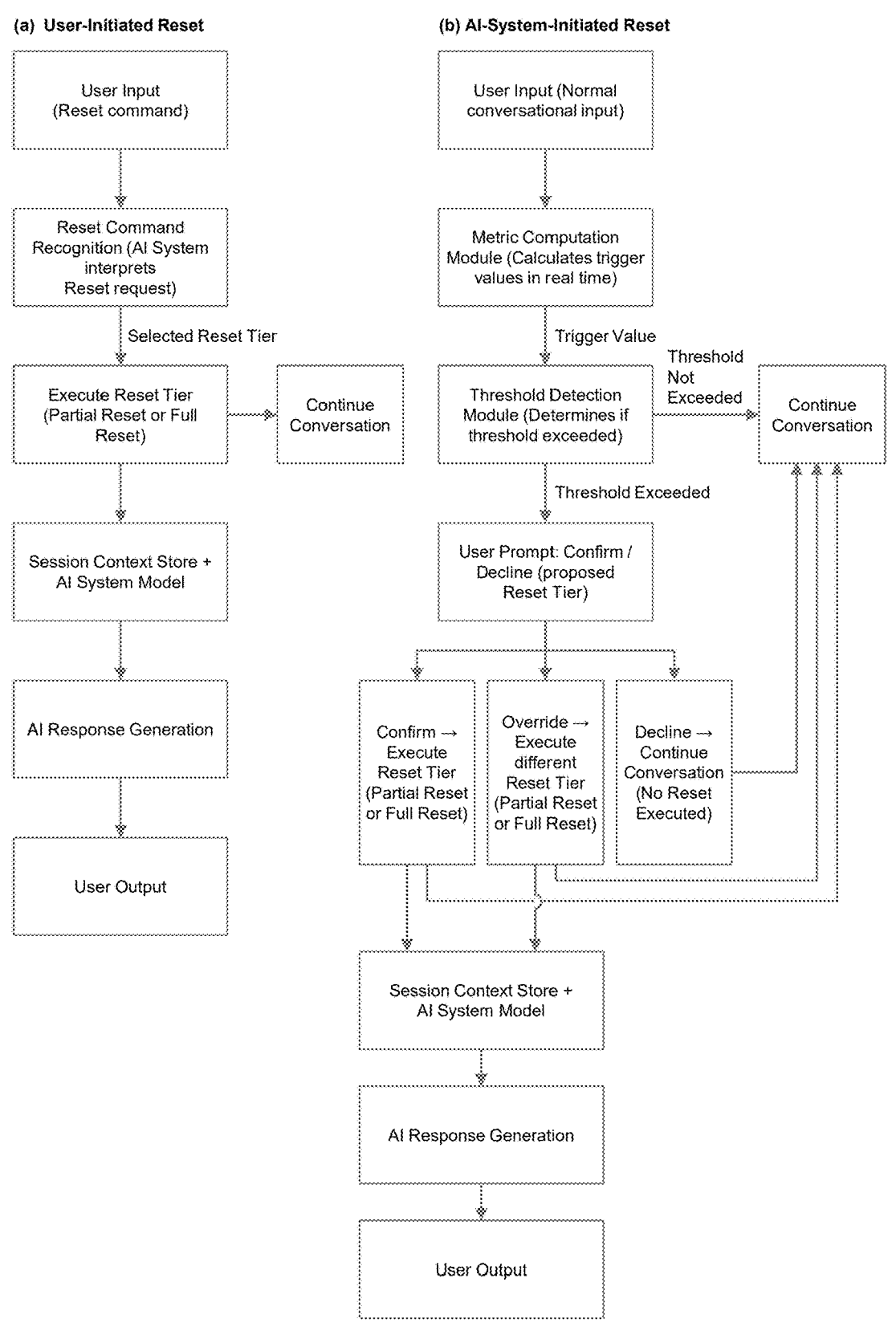
FIG. 3 compares User-Initiated and AI-System-Initiated reset pathways, showing how a reset is executed either upon direct User command or when the AI detects that a reset trigger threshold has been exceeded.

FIG. 3 depicts two execution pathways for Session Context Reset: (a) a User-Initiated Reset, where the User explicitly issues a reset command, and (b) an AI-System-Initiated Reset, where the Conversational AI Engine (104) detects that the Session Context Reset Trigger value has exceeded a preset threshold and prompts the User for confirmation. In the User-Initiated pathway, the Conversational AI Engine (104) processes the command directly and executes the reset, which may be a Partial Reset or a Full Reset. In the AI-System-Initiated pathway, the Metric Computation Module (108) calculates trigger values in real time. When the Threshold Detection Module (110) determines that a threshold has been exceeded, the Conversational AI Engine (104) initiates a User Prompt to Confirm, Decline, or Override the proposed reset. Upon confirmation, the Conversational AI Engine (104) executes the reset as a Partial Reset or a Full Reset. The figure illustrates the dual-mode initiation framework of the invention, supporting both proactive User control and autonomous system intervention based on quantifiable metrics. This dual-mode framework is further illustrated by the specification's Examples, which enumerate specific triggers (e.g., Semantic Drift, Sentiment Volatility Index, Repetition Frequency, Clarification Prompt Density) and show how they are used to compute the threshold values underlying the AI-System-Initiated pathway.

Figure 4:
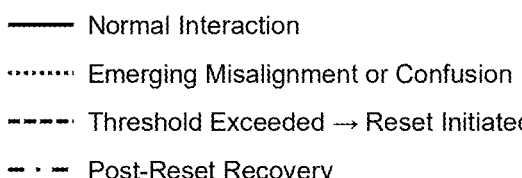
FIG. 4 shows a representative conversation timeline progressing from Normal Interaction to Misalignment or Confusion, Threshold Exceedance and Reset Initiation, and Post-Reset Recovery, with metrics such as Semantic Drift and Sentiment/Relevance plotted across conversational turns. For clarity, the functions performed by the User Validation Module—which solicits, receives, and records User confirmation or rejection of a proposed Context Reset—are performed within existing system components shown in FIG. 1, specifically the User Interface (i.e., the User Interface performs the combined functions of interface and validation).
Figure 4:
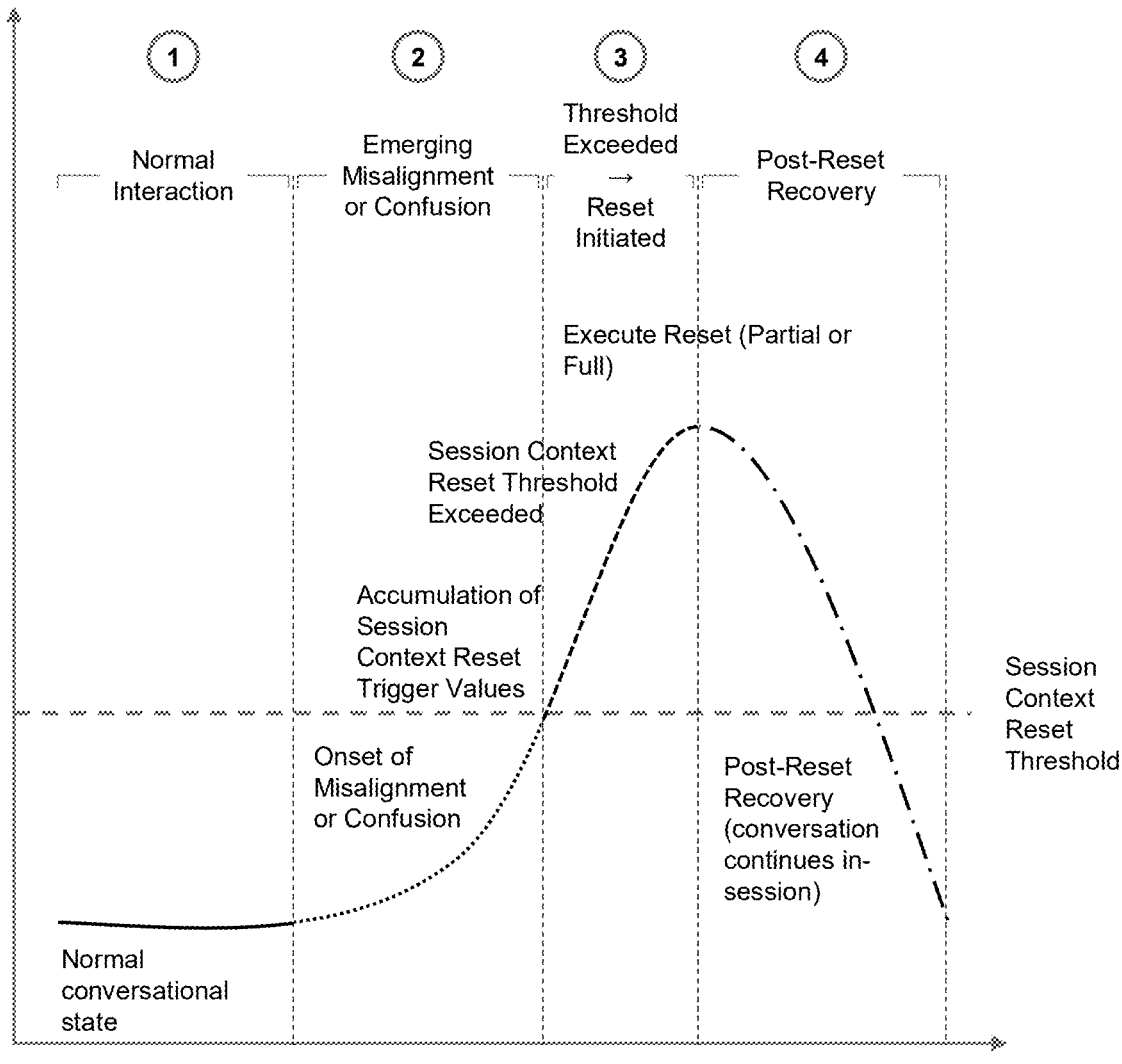

FIG. 4 illustrates a representative session timeline progressing through four phases: "Normal Interaction," "Emerging Misalignment or Confusion," "Threshold Exceeded→Reset Initiated," and "Post-Reset Recovery." The plotted timeline demonstrates how a conversation moves from an aligned state to one where confusion or drift accumulates, represented by rising Session Context Reset Trigger values. Once the values cross the defined threshold line, a reset is activated. After the reset, the conversation resumes with an updated Active Conversational Context, showing recovery of relevance and reduction of Conversational Confusion or Dissatisfaction. The timeline includes monitored metrics—such as Semantic Drift, Sentiment Volatility, Repetition Frequency, and Clarification Prompt Density—plotted across successive conversational turns, making clear the temporal dynamics of detection, intervention, and recovery. This figure illustrates how the system quantitatively detects and corrects conversational drift through time-sensitive Session Context Reset operations.

As would be understood by one of ordinary skill in the art, certain computational or interface functions described herein—such as the User Validation Module or archive and recall logic—are embodied within existing components depicted in the figures, as detailed above.

The modules described in the above figures rely on technology and capabilities already known in the art and may be implemented using established techniques, including those leveraging Artificial Intelligence (AI). In one or more embodiments, these modules execute over conventional transformer-based architectures or equivalent processor-executed inference systems, leveraging embedding representations, token weighting, and attention-masking operations to quantify and adjust conversational alignment. The implementation may use standard frameworks known in the art, such as those employing vector embeddings and contextual weighting to measure semantic similarity and conversational coherence.

In all embodiments, once a reset is executed, subsequent system responses are generated exclusively from the post-reset context. The reset may involve deletion, Masking, or De-Weighting of Prior Session Memory, enabling the system to emulate a fresh conversational state while still maintaining continuity (e.g., authentication, personalization, and integration).

The invention also supports archival, rather than deletion, of reset context to enable future restoration. This approach increases robustness in dynamic interactions where Misalignment or Confusion is intermittent or User intent shifts frequently. The choice between archival, Suppression, De-Weighting, or deletion is an implementation option and may be configured by system design or User preference. Any of these approaches may be used without affecting the core functionality of the invention.

The invention contemplates both manual and automated triggers for context reset. In certain embodiments, the Session Context Reset may be initiated automatically, manually, or through a hybrid mode that combines automated detection with optional User confirmation. All such implementations are considered within the scope of this disclosure. In certain embodiments, the Session Context Reset is activated not because the system understands the reason for confusion, but precisely because it does not. When the underlying cause of Misalignment or Confusion cannot be resolved through further inference—such as when the AI System cannot accurately determine the User's actual objectives—the system treats the condition as "intent-blind," i.e., rather than attempting deeper interpretation, it initiates a structured reset process. This design enables coherence recovery even when the source of confusion is not computationally determinable, distinguishing the invention from intent-recognition systems that presuppose the AI can determine the cause of the conversational failure. Manual Override Commands may include natural language inputs such as "Let's start over," while automated triggers may rely on quantified metrics such as Semantic Drift Score (e.g., Cosine Similarity between new input and context Vectors), Sentiment Volatility Index (e.g., polarity fluctuation across User turns), Repetition Frequency (e.g., AI reusing the same response patterns), and Clarification Prompt Density (e.g., proportion of User utterances seeking clarification).

A Multi-Factor Scoring System can be used to synthesize these metrics into a unified Session Context Reset Trigger score. This provides a robust and objective basis for managing reset decisions and can be implemented using mechanisms known in the art, such as those employed to score the effectiveness of existing AI Systems. These automated triggers operate as a fail-safe mechanism—complementary to, but independent from, any intent-recognition process—ensuring that recovery is possible even when the AI cannot identify the reason for the failure.

When the Session Context Reset Trigger value exceeds a predefined Session Context Reset Threshold, the AI System may initiate progressively stronger intervention measures, like a multi-stage fault management system. Tier 1 (Partial Reset) is applied when severity is low to moderate. The system may re-ask the most recent User question, propose alternative interpretations, or request clarification without discarding any context. Tier 2 (Full Reset) is applied when severity exceeds the maximum threshold, indicating that further conversation within the current context is unlikely to produce accurate or relevant results. The system may archive the entire Prior Context segment and rebuild the conversation state from system prompts and persistent parameters only, preserving Session-Level Settings and integrations. By scaling corrective action according to the measured severity of Misalignment or Confusion, the system can address emerging confusion early with minimal disruption while ensuring that unrecoverable states are efficiently corrected by a complete reset. This approach reduces wasted processing cycles, improves output reliability, and maintains User trust in the AI System's responsiveness. Building on this framework, the following Table 1 illustrates the two-tiered reset structure in a structured, comparative format, providing a clear summary of how intervention levels scale with the measured severity of Misalignment or Confusion.

The Session Context Reset Trigger operates independently of the AI System's determination of intent. Misalignment or Confusion may persist because the User's actual objective (the meaning or purpose intended by the User)

may be wrongly or otherwise inaccurately determined by the AI System because it is not directly observable. Conventional models attempt to determine User intent from linguistic or statistical patterns, but such determinations, by their inferential nature, may diverge from the User's actual objectives.

When such divergence is present, the AI System's continuing inferences can be inherently unreliable and may reinforce the same confusion they seek to correct. The present invention therefore focuses on detecting measurable conversational divergence as a predicate for a reset—rather than reforming the ongoing inferential processes in which an AI system determines intent from User inputs. This design recognizes that the User's actual objectives (meaning or purpose) can at best be imperfectly captured in an AI system's inferential intent determination. When the intent determination exceeds the divergence threshold, the User-Guided Context Reset affords the opportunity for addressing the divergence by permitting the AI System to reset its intent determination in a manner that can be more faithful to the actual objectives of the User.

Table 1 presents a two-tier Session Context Reset structure, comprising Tier 1 (Partial Reset) or Tier 2 (Full Reset). Each tier is associated with a specific operational scope and Session Context Reset Trigger Threshold value. The table conveys, in a concise comparative format, how the invention dynamically scales intervention according to measured severity. This two-tiered threshold approach facilitates precision resets that minimize unnecessary loss of relevant Session data.

| Tier | Reset Scope | Trigger Threshold | Effect on Context |
|---|---|---|---|
| Tier 1—Partial Reset | Rolls back the Active Context to an earlier state | Low-level Misalignment or Confusion threshold exceeded | Most of the conversation history retained |
| Tier 2—Full Reset | Clears the entire Active Context | Severe Misalignment or Confusion threshold exceeded | Only Personalization and Integration State data retained for Session continuity |

As shown in Table 1, the two-tiered structure enables flexible management of Active Conversational Context by matching the scope of the reset with the measured level of disruption. This approach promotes efficient recovery while preserving valuable Session information.

The following examples provide non-limiting illustrations of how quantitative measures may be implemented in hardware or software to generate the Session Context Reset Trigger. These examples demonstrate processor-executed computations that translate conversational features into measurable indicators of Misalignment or Confusion, thereby enabling consistent and repeatable reset activation across embodiments.

Components of the Session Context Reset Trigger may be quantified using methodologies known in the art. For example:

(1) Semantic Drift Score may be calculated by embedding each User Input and AI response into a Vector space and measuring divergence from the semantic centroid of the Session. A reset is initiated when this divergence exceeds a configured threshold value. For illustration, one embodiment may use a cosine distance in the range of 0.4-0.5.

(2) Sentiment Volatility Index may be calculated by running Sentiment analysis on each conversational turn and measuring the variance over the last N turns (e.g., 3-5). A sudden swing or repeated swings within this window indicate Misalignment or Confusion.

(3) Repetition Frequency may be calculated by monitoring the n-gram or semantic similarity of recent AI outputs to prior outputs. A reset is initiated when repetition exceeds a configured similarity threshold. For illustration, one embodiment may treat similarity above about 80% across two or more consecutive turns as indicative of a reset.

(4) Clarification Prompt Density may be calculated by detecting consecutive User turns that request clarification, correction, or rephrasing. A reset is initiated when this density exceeds a configurable threshold ratio. For illustration, one embodiment may use about 50% of the last four User turns.

Together, these processor-computed metrics form a quantitative basis for detecting conversational divergence, enabling the Conversational AI System to measure Misalignment or Confusion in a reproducible and implementation-independent manner.

Using preset threshold values ensures that resets occur in a precise and repeatable manner, without requiring the User to manually identify and correct the underlying cause of Misalignment or Confusion.

Functionally, the Session Context Reset operates as a conversational fail-safe subsystem designed to restore stability when primary intent-tracking mechanisms fail. It complements, rather than replaces, existing intent-recognition functions. In this sense, the invention ensures reliable conversational recovery even when the source of Misalignment or Confusion cannot be inferred, providing an autonomous recovery mechanism for maintaining coherence when inference-based systems reach their operational limits. Finally, a Session Context Reset may be temporary or permanent. If temporary, the prior conversation state is placed into an inactive buffer. The system continues without referencing this buffer unless the User directs restoration of the prior state, at which point the buffered information is merged back into the Active Context window. In a permanent reset, the prior conversation state remains archived and is not re-linked within the current Session. In both cases, the storage of reset data is governed by the same Context Management and Archive and Recall Modules described above, ensuring that either form of reset operates through processor-executed control rather than manual deletion or recreation of Session state.

As described in the enumerated examples above, the Conversational AI System may exist in various embodiments. For example:

The following embodiments illustrate practical implementations of the invention across differing deployment environments, demonstrating that the disclosed Session Context Reset framework is architecture-agnostic and adaptable to any conversational modality.

(1) A Web-Based Chatbot, in which a cloud-hosted chatbot detects User confusion through a reset command and rebuilds its prompt buffer (i.e., the portion of the Session Context Store used to hold active conversational tokens) excluding earlier conversational tokens;

(2) A Local Assistant, such as a mobile assistant with a UI-based reset button that, when selected, initiates Memory Segmentation Suppression and begins inference from a clean state;

(3) A Multi-Modal System, such as a voice assistant that analyzes vocal tone and Sentiment to detect confusion and proposes reconstruction using only fresh input; and (4) A Stateless or Simulated-Stateless Model, such as a transformer model in which a special <RESET> token or new Session context ID simulates reset behavior across consecutive API calls.

Thus, the invention extends beyond "chatbots" and applies to any AI System using historical state to influence current inference, including conversational coding tools, task planners and workflow engines, multi-step form fillers, and document reviewers or legal assistants. More generally, Session Context Reset applies to any interactive exchange format, including AI-initiated questioning, adaptive guidance, or dynamic re-sequencing of conversation flow.

In addition, the reset mechanism may include User-configurable parameters governing the AI's authority to make or apply changes without explicit consent, such as: (a) "Make other changes as you see fit," (b) "Do not make any changes unless instructed," or (c) "If you make changes, clearly highlight them and allow the User to address them before proceeding."

In certain embodiments, the Session Context Reset may be accessed through APIs, plugins, or developer tools, enabling external applications or platforms to programmatically trigger or manage context resets. For example, third-party developers may embed this functionality within chat interfaces, customer service flows, or AI-powered diagnostic systems. The context reset mechanism applies equally to multi-modal AI Systems, including those that process and respond via speech, audio, image, video, or gesture input. In such systems, 'context' may include transcripts, extracted visual metadata, audio tone patterns, gesture sequences, or other input-derived representations that influence ongoing system behavior.

Unlike initiating a completely new AI Session—which typically resets identity, access, or personalization settings, the present invention enables a contextual reset within the same Session. This preserves Session-specific parameters such as User login state, authorization, application integrations, and memory persistence rules, while isolating the Conversational AI System's dialog behavior from prior exchanges. In contrast to existing manual controls in some AI interfaces (e.g., starting a new thread or typing an explicit instruction such as "ignore previous discussion"), the invention provides a programmatic, one-step Session Context Reset that retains Session continuity and system integrations. The reset may be applied selectively (full or partial) and can be triggered automatically without explicit User Input. The result is a seamless User experience that remains both fresh and contextually stable.

The Session Context Reset Trigger may be computed as a composite score combining at least two of Semantic Drift Score, Sentiment Volatility Index, Repetition Frequency, and Clarification Prompt Density. In this regard, a Partial Reset may be configured to take place if a single metric exceeds a lower threshold, while a Full Reset may be configured to occur if multiple metrics concurrently exceed higher thresholds. The Partial Reset or Full Reset may involve partitioning and archiving affected portions of the Active Context for optional recall after the reset. In this regard, reset thresholds may be dynamically adjusted based on Session length, User profile, or prior reset frequency. Finally, User Inputs and System Outputs generated after a reset are based exclusively on the modified Active Context in combination with the preserved Personalization and Integration State, excluding the archived context.

The processor-implemented modules described herein may be realized using conventional machine-learning and natural-language-processing techniques known in the art. For illustration, the Metric Computation Module may operate over vector embeddings generated by a pretrained language model (e.g., transformer architecture) to compute measures such as Semantic Drift, Sentiment Volatility, or Repetition Frequency. These computations may be implemented using cosine similarity, variance of sentiment scores, or n-gram overlap algorithms, respectively.

In one embodiment, conversational turns are stored in a vector database or equivalent key-value memory structure, enabling efficient retrieval and contextual weighting. During a Session Context Reset, the Context Reset Module applies processor-executed masking operations to the model's attention matrices or token-weight arrays to suppress, remove, or de-weight portions of the Active Context while maintaining access to stored personalization parameters.

In certain implementations, these operations are integrated within the inference loop of a large-language-model pipeline, where context truncation, masking, and re-weighting are standard computational steps. The present invention extends these mechanisms by introducing processor-implemented threshold detection logic that dynamically triggers such context resets based on computed metrics, thereby reducing redundant token processing and improving computational efficiency.

The following examples illustrate representative implementations of the invention and demonstrate how the Session Context Reset Trigger may be computed and applied using processor-implemented quantitative metrics—including Semantic Drift, Sentiment Volatility, Repetition Frequency, and Clarification Prompt Density. These examples are provided solely to facilitate understanding of the invention's operation and are not limiting. Unless otherwise stated, all numeric thresholds (e.g., similarity scores, volatility indices, repetition percentages, clarification ratios) are illustrative processor-computed embodiments. Functionally equivalent values, ranges, or mathematical formulations that achieve substantially the same result are encompassed within the scope of the invention.

Example 1: Partial Session Context Reset Triggered by Semantic Drift

In a Multi-Turn Interaction with a digital tutor AI System, the User begins by discussing AI hardware capabilities. Over several turns, the User gradually shifts topics, asking about "circuit design" and "quantum computing" without explicitly indicating a change of subject.

The system calculates a Semantic Drift Score by measuring the Cosine Similarity between the embedding Vector of each new User Input and the centroid Vector of prior User Inputs.

| Turn | Cosine Similarity | Semantic Drift Score (1—similarity) |
|------|-------------------|-------------------------------------|
| 1-2  | 0.92              | 0.08                                |
| 2-3  | 0.89              | 0.11                                |
| 3-4  | 0.70              | 0.30                                |
| 4-5  | 0.62              | 0.38                                |

The reset threshold for Semantic Drift is defined as a predetermined value. At the point when the Semantic Drift Score exceeds this threshold, the system prompts the User with a reset option:

"It looks like our conversation is shifting to a different topic. Would you like to reset the context?"

For illustration, one embodiment may configure this threshold within a range of approximately 0.30 to 0.40 cosine distance (or equivalent semantic-divergence measure); however, the invention is not limited to any particular numeric value or computational technique for determining that threshold.

Example 2: Full Session Context Reset Triggered by Combined Metrics

In a customer support chatbot interaction, the following values are computed after ten conversational turns:

Sentiment Volatility Index: 0.80 (scale of 0 to 1, where >0.60 indicates high fluctuation)

Repetition Frequency: 3 repeated outputs within last 4 turns (normalized to 0.60 based on a threshold of 5)

Clarification Prompt Density: 0.60 (6 clarification requests out of 10 User Inputs)

Each metric exceeds its respective Session Context Reset Threshold, defined as:

| Metric | Threshold | Measured/Normalized Value |
|--------|-----------|---------------------------|
| Sentiment Volatility | 0.60 | 0.80 (already normalized) |
| Repetition Frequency | 2 | 3 (measured) → 0.60 (normalized) |
| Clarification Prompt Density | 0.40 | 6/10 (measured) → 0.60 (normalized) |

A processor-implemented Multi-Factor Scoring Module assigns the following weight coefficients:

Sentiment Volatility (40%)

Repetition Frequency (30%)

Clarification Prompt Density (30%)

The module computes a Composite Misalignment or Confusion Score using a weighted-sum function: $(0.80 \times 0.40)+(0.60 \times 0.30)+(0.60 \times 0.30)=0.68$.

When this computed value exceeds the Session Context Reset Trigger Threshold (e.g., 0.65), the system automatically or upon User confirmation initiates a Tier 2 Full Reset, preserving the Personalization and Integration State.

Example 3: Partial Reset Based on Clarification Prompts

In a Conversational AI System designed to assist with programming questions, a User repeatedly asks the system to clarify or rephrase its responses.

The Conversational AI System computes a Clarification Prompt Density metric by quantifying the proportion of recent User turns classified as clarification requests. When this processor-computed metric exceeds a configurable threshold value, the system isolates the portion of the Active Context most strongly correlated with the detected Misalignment or Confusion.

The system then initiates or proposes a Tier 1 (Partial) Session Context Reset, removing or De-Weighting the misaligned elements while preserving all unaffected context. The User may be notified, for example:

"I've reset the parts of our conversation that may have caused confusion. Let's continue from here."

For illustration, one embodiment may configure this threshold at approximately 50 percent of recent User turns, though the invention is not limited to any specific numeric value or classification method.

Example 4: Deferred Reset Based on User Override

In a legal assistant AI Session, the Session Context Reset Trigger value reaches 0.68, exceeding the defined Session Context Reset Threshold of 0.65. The User Validation Module prompts:

"I'm detecting some confusion in our conversation. Would you like me to reset the context?"

The User replies: "No, just keep going, I'll clarify."

Instead of discarding the trigger, the system records a Deferred Reset Marker within the Session Context Store to track the pending reset condition. On subsequent turns, additional Misalignment indicators rise:

Repetition Frequency=4 repeated outputs (threshold=3)

Semantic Drift Score=0.35 (threshold=0.30)

The composite Misalignment or Confusion score increases to 0.80, exceeding the higher Tier 1 reset threshold. The system re-engages the User Validation Module and, upon confirmation, performs a Tier 1 (Partial) Reset.

Example 5: Semantic Drift Measures

Semantic Drift may be assessed by embedding each conversational turn into a high-dimensional Vector space (for example, using a sentence-level transformer, embedding model, or other equivalent technique) and calculating the similarity between the most recent turn and a Session centroid Vector. For illustration, one embodiment may yield a measured Cosine Similarity of 0.62. Semantic Drift, being the absence of similarity, is determined by subtracting the Cosine Similarity from 1, since Cosine Similarity is an inherently normalized value. This produces a normalized Semantic Drift Score of 1 minus 0.62 or 0.38. When the computed Trigger value indicates a divergence beyond a configurable Session Context Reset Threshold, the System outputs a proposal for a Tier 1 reset (partial removal of the most recent N turns). For illustration, one embodiment may use a threshold in the range of 0.4-0.5 cosine distance (equivalent to a normalized Semantic Drift Score of about 0.35-0.40), although the invention is not limited to these values.

Example 6: Sentiment Volatility Measures

Sentiment analysis is performed using a Sentiment analysis model (e.g., a rule-based or machine-learning-based classifier), with negative Sentiment values aggregated over a rolling window of five conversational turns. For illustration, one embodiment may yield a measured Sentiment score of −0.68, corresponding to a normalized Sentiment Volatility Index of 0.68 on a 0-1 scale. When the computed Trigger value crosses a configurable Session Context Reset Threshold (for example, in the range of 0.60-0.65), the System outputs a proposal for a Tier 2 Partial Reset.

Example 7: Repetition Frequency

Repetition Frequency is measured by evaluating n-gram overlaps or semantic similarity between AI outputs using a Similarity Model. For illustration, one embodiment may yield a measured repetition count of 3 within the last 5 conversational turns, corresponding to a normalized Repetition Frequency of 0.60 (based on a threshold of 5). When this Trigger value exceeds a configurable Session Context Reset Threshold (for example, 0.40), the System outputs a proposal for a reset (e.g., Partial Reset including removal of repetitive context segments).

Example 8: Clarification Prompt Density

Clarification Prompt Density is measured by detecting clarification keywords or phrases in User Inputs (e.g., "That's not what I meant," "Let's try again," "Please rephrase"). For illustration, one embodiment may yield a measured value of 6 clarification requests out of 10 User Inputs, corresponding to a normalized Clarification Prompt Density of 0.60. When this Trigger value exceeds a configurable Session Context Reset Threshold (for example, 0.40), the System outputs a proposal for a Tier 1 reset if the condition is met in a single rolling window, or a Tier 2 Full Reset if the condition persists across multiple consecutive windows.

Example 9: Manual Reset Command

A direct User instruction to initiate a reset bypasses threshold evaluation and directly triggers the selected reset level (Tier 1 or Tier 2).

Example 10: System-Initiated Reset Based on Multi-Metric Trigger

A Session Context Reset is activated when multiple monitored metrics simultaneously exceed their thresholds (e.g., high Semantic Drift combined with high Repetition Frequency). This results in a Full Reset of the Active Conversational Context while preserving Personalization and Integration State.

Example 11: Memory Segmentation and Suppression

Upon determination that the Session Context Reset Threshold has been reached, the Conversational AI Engine (104) initiates Memory Segmentation and Suppression operations executed by the Context Reset Module (112). These operations partition the Session Context Store (106) into a Prior Context Segment and a New Active Segment. The Prior Context Segment is then excluded from subsequent inference through token truncation, Attention Masking, or Zero-Weight Tagging-processor-implemented techniques that suppress the influence of prior tokens without deleting stored data. The Inference Controller, operating as part of the Conversational AI Engine (104), generates new model prompts exclusively from the New Active Segment, ensuring that prior conversational content exerts no computational influence during token sequence generation. An Archive and Recall Module may optionally preserve the suppressed segment in an inactive state for later retrieval, allowing User Inputs such as "Remind me what I said earlier" to reactivate archived Context Blocks without reconstructing the prior Session.

The algorithmic outlines and mock Sessions described in the foregoing examples are provided as illustrative embodiments to demonstrate how the disclosed reset methods may be implemented in practice. They are not intended to limit the invention to a particular software product or implementation, but rather to show that the concepts are enabled and operable across diverse conversational AI platforms.

The invention claimed is:

1. A processor-implemented conversational AI system that, during a single AI session, generates a dialogue comprising user inputs and system outputs, and implements an improvement for a conversational AI engine comprising:

a processor-implemented session context reset trigger configured to detect misalignment or confusion based on quantitative, processor-computed metrics derived from successive user inputs and system outputs;

wherein detection of misalignment or confusion by the session context reset trigger is performed independently of any intent determination, and wherein the trigger is based solely on processor-computed metrics quantifying observable conversational divergence rather than any semantic reconstruction or prediction of the user's intended meaning;

wherein, upon determination by a threshold detection module that a session context reset threshold associated with said trigger has been exceeded, a context reset module executes a session context reset to modify an active context;

wherein the context reset module modifies the active context by at least one of removing, masking, suppressing, de-weighting, or isolating context portions, while preserving a stored personalization and integration state of the AI session; and wherein post-reset system outputs are generated, by a processor executing the conversational AI engine, with reference to the modified active context and the preserved personalization and integration state until termination of the AI session, thereby reducing propagation of irrelevant active context, lowering redundant computation cycles, optimizing memory utilization, and improving overall computational efficiency of the processor-implemented conversational AI system.

2. The system according to claim 1, wherein an indicator of session quality is processor-computed and may include one or more of:

(i) divergence of semantic meaning across successive conversational turns, (ii) variability in sentiment across conversational turns, (iii) frequency of repeated content elements, or (iv) density of clarification prompts.

3. The system according to claim 1, wherein the session context reset trigger operates independently of any explicit or declarative statement of user objectives, enabling detection and correction of misalignment or confusion even when a user's stated objectives are incomplete, evolving, or inaccurate.

4. The system according to claim 1, wherein a semantic drift score is computed using cosine similarity between vector embeddings of consecutive conversational turns.

5. The system according to claim 1, wherein a sentiment volatility index is computed as the variance of polarity scores within a sliding window of n conversational turns.

6. The system according to claim 1, wherein repetition frequency is computed by detecting n-gram overlaps or embedding similarity above a predefined threshold between conversational turns.

7. The system according to claim 1, wherein clarification prompt density is determined as a proportion of conversational turns within a fixed-length sequence that are classified as clarification requests.

8. The system according to claim 1, wherein the context reset module integrates with an application programming interface (api) enabling external applications to trigger or manage context resets.

9. The system according to claim 1, wherein the session context reset trigger is computed as a composite score combining at least two of semantic drift score, sentiment volatility index, repetition frequency, and clarification prompt density.

10. The system according to claim 1, wherein a partial reset occurs if a single metric exceeds a lower threshold, an intermediate reset occurs if a composite score exceeds an intermediate threshold, and a full reset occurs if multiple metrics concurrently exceed higher thresholds.

11. The system according to claim 1, wherein executing a reset comprises partitioning and archiving affected portions of the active context for optional recall after the reset.

12. The system according to claim 1, wherein reset thresholds are dynamically adjusted based on session length, user profile, or prior reset frequency.

13. The system according to claim 1, wherein responses generated after a reset are based exclusively on the modified active context in combination with preserved personalization and integration state, excluding archived context.

14. A computer-implemented method for reducing misalignment or confusion in a conversational AI system that generates multiple conversational turns of user inputs followed by system outputs during a single AI session, the method comprising:

(a) detecting, by a session context reset trigger, misalignment or confusion based on one or more processor-computed dialogue metrics derived from user inputs and system outputs; wherein detection of misalignment or confusion by the session context reset trigger is performed independently of any intent determination, and wherein the trigger is based solely on processor-computed metrics quantifying observable conversational divergence rather than any semantic reconstruction or prediction of the user's intended meaning;

(b) determining that a session context reset threshold has been reached or exceeded;

(c) executing a session context reset that modifies an active context, while preserving a stored personalization and integration state; wherein executing the session context reset comprises isolating a portion of the active context and modifying it by one or more of removal, suppression, masking, de-weighting, or partitioning; and (d) continuing the AI session after the reset, with post-reset system outputs generated from the active context in combination with the preserved personalization and integration state until a session termination event;

wherein the method reduces nonproductive computation, limits propagation of irrelevant active context, and optimizes memory use, thereby improving computational efficiency and restoring conversational coherence between user inputs and system outputs.

15. The method according to claim 14, wherein detecting misalignment or confusion by the session context reset trigger is performed independently of any intent determination, and wherein the detection is based solely on processor-computed metrics that quantify observable conversational divergence rather than any semantic reconstruction or prediction of the user's intended meaning.

16. The method according to claim 14, wherein the session context reset trigger is based on one or more of semantic drift score, sentiment volatility index, repetition frequency, or clarification prompt density.

17. A conversational AI system for reducing misalignment or confusion during a single AI session in which user inputs generate corresponding system outputs, the system comprising:

(a) a processor-implemented context analysis module configured to process successive user inputs and system outputs of each conversational turn;

(b) a processor-implemented metric computation module configured to quantify a session context reset trigger, the trigger being based on processor-computed measures of conversational alignment, consistent with one or more defined metrics comprising semantic drift score, sentiment volatility index, repetition frequency, or clarification prompt density; wherein detection of misalignment or confusion by the session context reset trigger is performed independently of any intent determination, and wherein the trigger is based solely on processor-computed metrics quantifying observable conversational divergence rather than any semantic reconstruction or prediction of the user's intended meaning;

(c) a processor-implemented threshold detection module configured to determine whether a session context reset threshold for any defined metric has been exceeded, or whether a user-initiated reset instruction has been received; and (d) a processor-implemented context reset module configured, upon such determination, to execute a session context reset while preserving a stored personalization and integration state;

wherein post-reset system outputs are generated solely with reference to an active context and the preserved personalization and integration state until termination of the AI session, thereby reducing redundant processing and improving computational efficiency; wherein executing the session context reset comprises isolating a portion of the active context and modifying it by one or more of removal, suppression, masking, de-weighting, or partitioning.

* * * * *